(12) United States Patent
Wu et al.

(10) Patent No.: US 12,001,015 B1
(45) Date of Patent: Jun. 4, 2024

(54) PROJECTION SYSTEM AND CONTACT LENS USED THEREFOR

(71) Applicant: HTC Corporation, Taoyuan (TW)

(72) Inventors: Chun-Yih Wu, Taoyuan (TW);
Ta-Chun Pu, Taoyuan (TW);
Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/150,796

(22) Filed: Jan. 6, 2023

(51) Int. Cl.
*G02B 27/00* (2006.01)
*G06F 3/01* (2006.01)

(52) U.S. Cl.
CPC ..... *G02B 27/0081* (2013.01); *G02B 27/0093* (2013.01); *G06F 3/013* (2013.01)

(58) Field of Classification Search
CPC ............ G02B 27/0081; G02B 27/0093; G02B 27/017; G06F 3/013
See application file for complete search history.

(56) References Cited

U.S. PATENT DOCUMENTS

| | | | |
|---|---|---|---|
| 10,529,107 B1 * | 1/2020 | Miller | G02C 11/10 |
| 2010/0045571 A1 * | 2/2010 | Yamamoto | G02B 27/0172 345/8 |
| 2015/0261294 A1 * | 9/2015 | Urbach | G02C 7/101 351/158 |
| 2019/0293964 A1 * | 9/2019 | Takaki | A61B 3/14 |

\* cited by examiner

*Primary Examiner* — Chineyere D Wills-Burns
*Assistant Examiner* — Cory A Almeida
(74) *Attorney, Agent, or Firm* — JCIPRNET

(57) ABSTRACT

A projection system includes an optical device, a positioning device, and a projector. The optical device has a substrate and at least two positioning components, and the at least two positioning components are respectively disposed on multiple different areas of the substrate. The positioning device performs positioning on the optical device according to the positioning component on the substrate and generates a position signal. The projector projects an image light beam to the optical device, receives the position signal, and determines a projection direction of the image light beam according to the position signal.

15 Claims, 3 Drawing Sheets

PROJECTION SYSTEM AND CONTACT LENS USED THEREFOR

BACKGROUND

Technical Field

The disclosure relates to a projection system and a contact lens, and in particular, to a projection system and a contact lens for adjusting a projection direction by detecting the position of the contact lens.

Description of Related Art

For various head-mounted display devices of virtual reality (VR) and augmented reality (AR), the field of view (FOV) of the display thereof is the main factor affecting the sense of immersion and visual effects. The display may use eye tracking to increase the field of view.

SUMMARY

The disclosure provides a projection system and a contact lens used with the projection system, which may expand the field of view of the projection.

A projection system of the disclosure includes an optical device, a positioning device, and a projector. The optical device has a substrate and at least two positioning components, and the at least two positioning components are respectively disposed on multiple different areas of the substrate. The positioning device performs positioning on the optical device according to the positioning component on the substrate and generates a position signal. The projector projects an image light beam to the optical device, receives the position signal, and determines a projection direction of the image light beam according to the position signal.

A contact lens used with the projection system of the disclosure includes a substrate and N number of positioning components. The N number of positioning components are respectively disposed on multiple different areas of the substrate, where N is a positive integer greater than or equal to 3.

Based on the above, in the projection system of the disclosure, positioning of the optical device is performed through the positioning device, so that the projector determines the projection direction of the image light beam according to the position of the optical device, so as to achieve a more accurate tracking of the field of view and further expand the field of view of the projection.

Although the disclosure has been described with reference to the embodiments above, the embodiments are not intended to limit the disclosure. Any person skilled in the art may make some changes and modifications without departing from the spirit and scope of the disclosure. Therefore, the scope of the disclosure will be defined in the appended claims.

DESCRIPTION OF THE EMBODIMENTS

Figure 1:
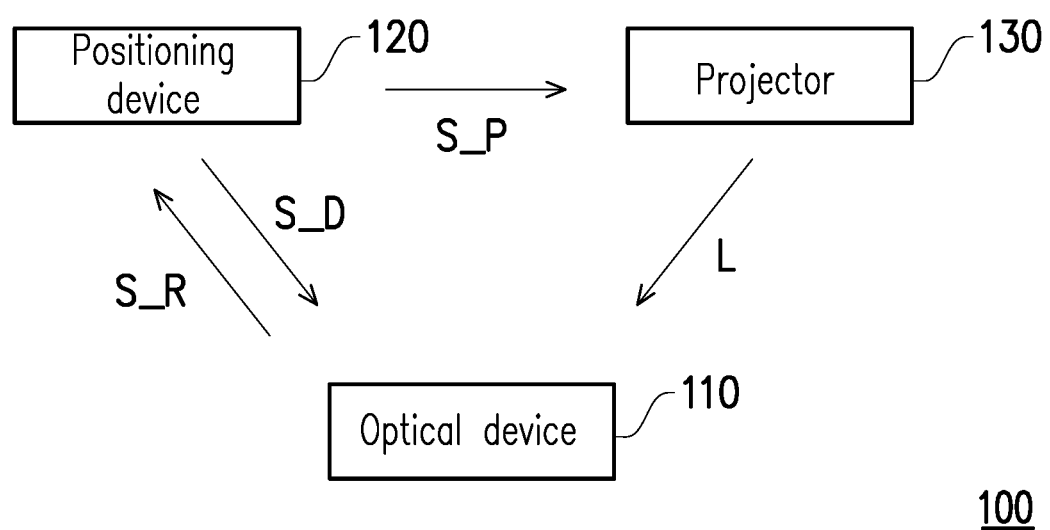
FIG. 1 is a schematic diagram of a projection system according to an embodiment of the disclosure.

FIG. 1 is a schematic diagram of a projection system according to an embodiment of the disclosure. A projection system 100 is used to generate display effects of virtual reality (VR), augmented reality (AR), or mixed reality (MR). In the embodiment, the projection system 100 includes an optical device 110, a positioning device 120, and a projector 130. The projector 130 is used to project an image light beam L to the optical device 110. The positioning device 120 may perform positioning on the optical device 110 by transmitting a sensing signal S_D to the optical device 110, so that the projector 130 may adjust the projection direction of the image light beam L according to the position of the optical device 110. The positioning device 120 may transmit the sensing signal S_D to the optical device 110. The optical device 110 may reflect the sensing signal S_D to generate multiple reflection signals S_R. The positioning device 120 receives the reflection signal S_R generated by the optical device 110, and calculates the position of the optical device 110 according to the reflection signal S_R, so as to generate and transmit a position signal S_P to the projector 130.

In the embodiment, multiple positioning components may be disposed on the optical device 110. The above-mentioned positioning components may be respectively disposed on multiple areas of the substrate of the optical device 110. Moreover, the sizes of the above-mentioned positioning components are different from each other, and the dielectric constant of the positioning components may be different from the dielectric constant of the substrate of the optical device 110; or the positioning components may contain metal components. When the positioning device 120 may transmit the sensing signal S_D to the optical device 110, the positioning component may reflect the sensing signal S_D and generate the multiple reflection signals S_R respectively. Based on the sizes of the positioning components being different from each other, when receiving the reflection signal S_R, the positioning device 120 may identify which of the positioning components the received reflection signal S_R comes from. Further, the positioning device 120 may calculate the position of the optical device 110 according to the phases of the multiple reflection signals S_R.

In the embodiment, the optical device 110 may be a contact lens, which fits the eyeball of the user. In the disclosure, the positioning device 120 may achieve the action of eye tracking by identifying the position of the optical device 110. The projection system 100 of the disclosure may effectively project the image light beam L of the display image to the eyeball of the user, thereby improving the display performance.

Incidentally, in the embodiment of the disclosure, the number of the positioning components on the optical device 110 may be at least two.

Figure 2:
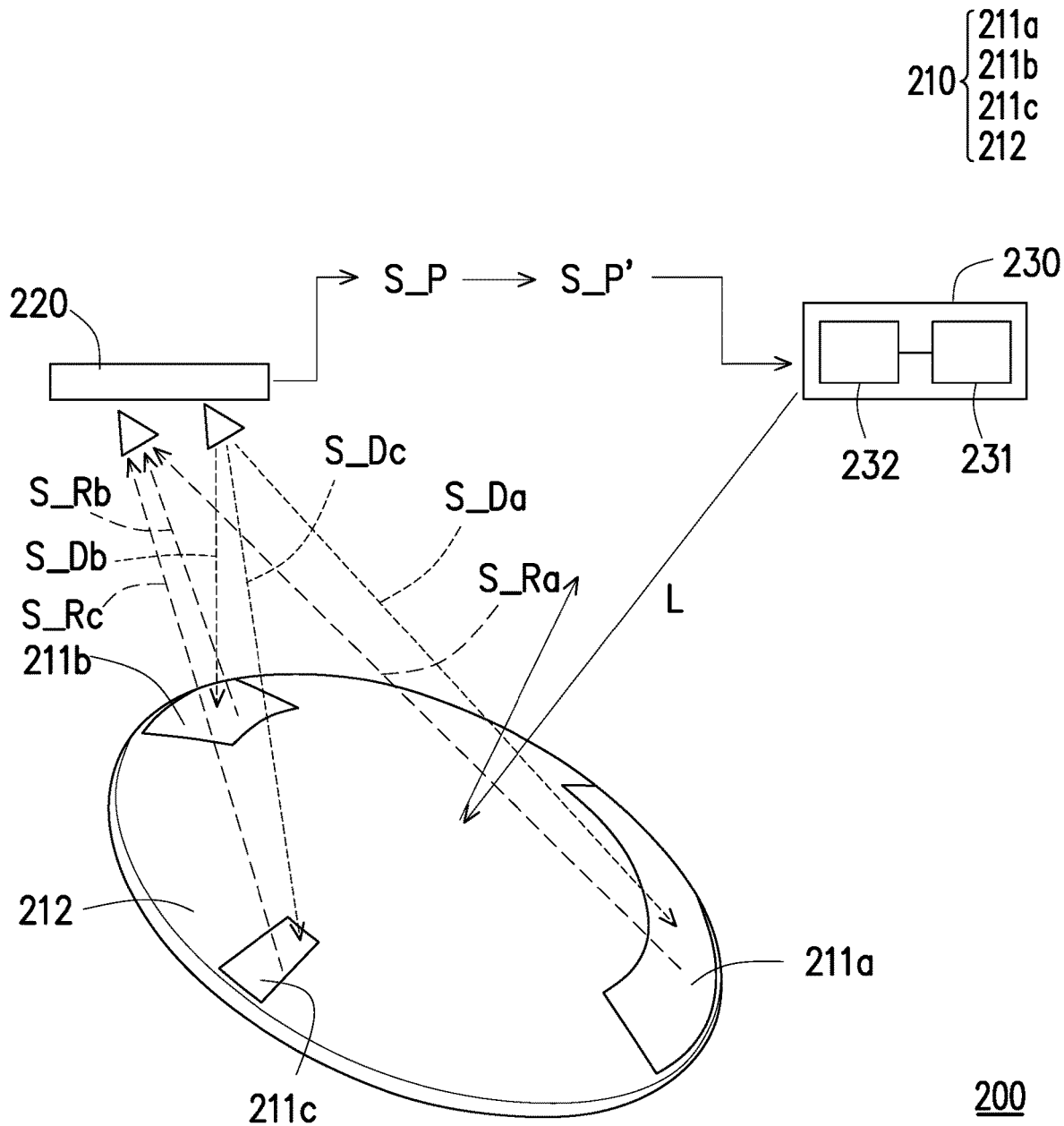
FIG. 2 is a schematic diagram of a projection system and a contact lens used therefor according to an embodiment of the disclosure.

Please refer to FIG. 2 below. FIG. 2 is a schematic diagram of a projection system and a contact lens used therefor according to an embodiment of the disclosure. In FIG. 2, a projection system 200 includes an optical device 210, a positioning device 220, and a projector 230. As shown in FIG. 2, the optical device 210 is a contact lens. The contact lens has a substrate 212 and three positioning components 211a to 211c. The positioning components 211a to 211c are respectively disposed on three different areas of the edge of the substrate 212. The positioning device 220 is a radar in the embodiment. It should be noted that, in the embodiment, the number of the positioning components 211a to 211c on the optical device 210 is three, and in other embodiments, the number of the positioning components on the optical device 210 may be greater than three. In addition, since the embodiment of FIG. 2 uses radar for positioning, the radar calculates the position of the optical device 210 according to the energy difference of the reflection signal generated by the received optical device 210, and the energy difference of the reflection signal is related to the material permittivity and the size of the reflection surface, so the dielectric constant of each of the positioning components 211a to 211c may be different from the dielectric constant of the substrate 212, and the sizes of the positioning components 211a to 211c are different from each other. In the embodiment, the size of the positioning component 211a is greater than the size of the positioning component 211b, and the size of the positioning component 211b is greater than the size of the positioning component 211c.

The positioning device 220 transmits multiple sensing signals S_Da~S_Dc towards the optical device 210, and the sensing signals S_Da~S_Dc are respectively received by the positioning components 211a to 211c. Here, the positioning components 211a to 211c may be metal materials. The positioning components 211a to 211c respectively generate multiple reflection signals S_Ra~S_Rc to the positioning device 220 according to the sensing signals S_Da~S_Dc.

Based on the positioning components 211a to 211c having different sizes and different positions, the individual signal strength (radar cross-section (RCS)) and the signal receiving time (time of flight (TOF)) are also different among the reflection signals S_Ra~S_Rc received by the positioning device 220. In this way, the positioning device 220 may perform triangulation positioning calculation according to the reflection signals S_Ra~S_Rc reflected by the positioning components 211a to 211c and obtain the position of the optical device 210.

The positioning device 220 generates a position signal S_P according to the obtained position of the optical device 210, and calculates an angle signal S_P' according to the position signal S_P. The positioning device 220 transmits the generated angle signal S_P' to the projector 230.

The projector 230 receives the angle signal S_P' and determines the projection direction of the image light beam L according to the angle signal S_P'. The projector 230 includes a controller 231 and an image light beam adjuster 232. The controller 231 is coupled to the actuator (such as a motor) in the image light beam adjuster 232, and drives the actuator according to the angle signal S_P' to adjust the light reflection angle of the optical reflection component in the image light beam adjuster 232, so as to change the projection direction of the image light beam L. The image light beam adjuster 232 may be, for example, a light reflection component.

The controller 231 may be a processor with computing capability. Alternatively, the controller 231 may be designed through a hardware description language (HDL) or any other digital circuit design method known to those skilled in the art, and a hardware circuit implemented in the form of a field programmable gate array (FPGA), a complex programmable logic device (CPLD), or an application-specific integrated circuit (ASIC).

Figure 3:
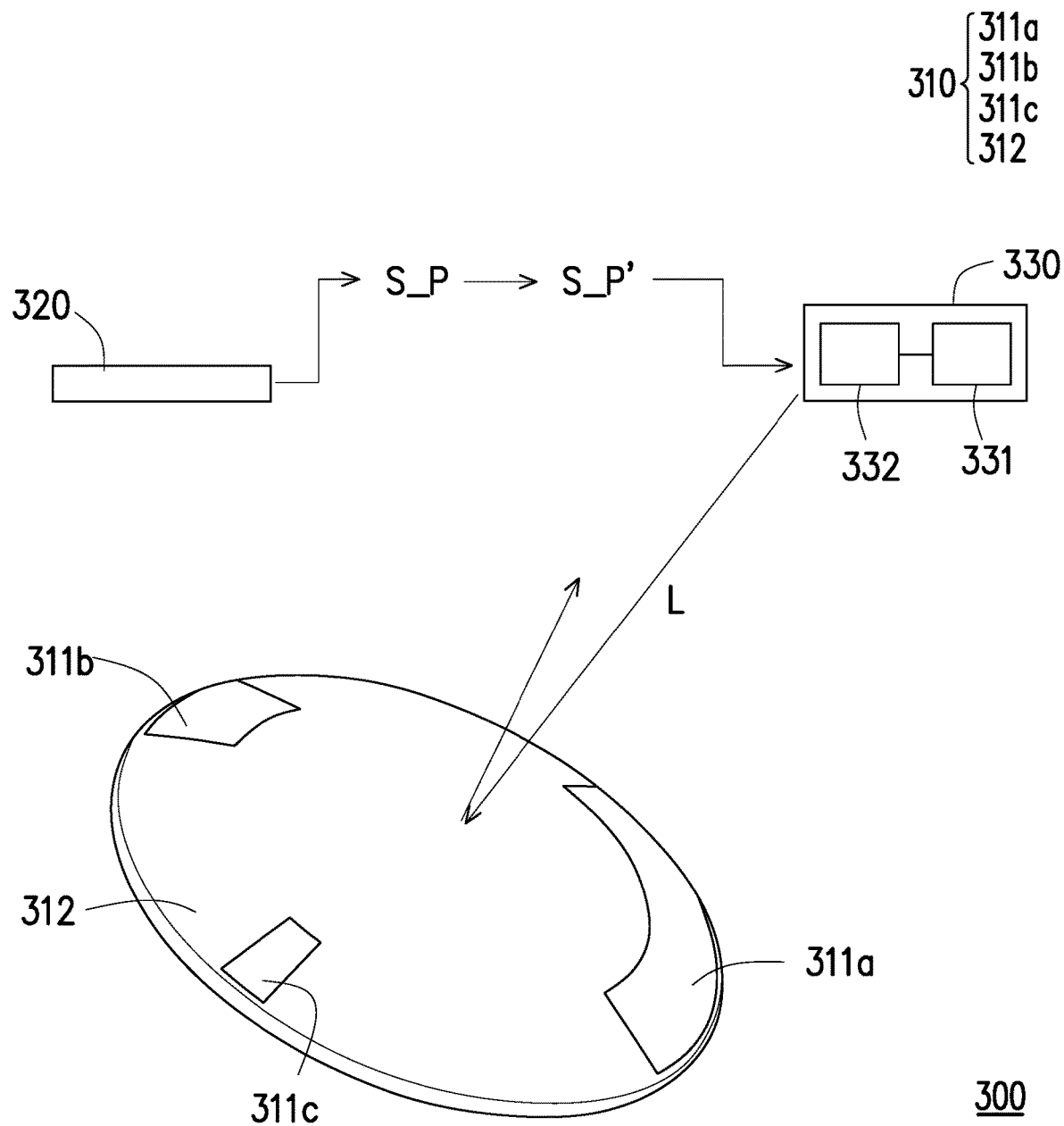
FIG. 3 is a schematic diagram of a projection system and a contact lens used therefor according to another embodiment of the disclosure.

Please refer to FIG. 3 below. FIG. 3 is a schematic diagram of a projection system and a contact lens used therefor according to an embodiment of the disclosure. In FIG. 3, a projection system 300 includes an optical device 310, a positioning device 320, and a projector 330. As shown in FIG. 3, the optical device 310 is a contact lens. The contact lens has a substrate 312 and three positioning components 311a to 311c. The positioning components 311a to 311c are respectively disposed on three different areas of the substrate 312. The positioning device 320 is a camera in the embodiment. It should be noted that in the embodiment, the number of the positioning components 311a to 311c on the optical device 310 is three, and in other embodiments, the number of the positioning components on the optical device 310 may be greater than or equal to two. In addition, since the embodiment of FIG. 3 uses a camera for positioning, the camera calculates the position of the optical device 310 according to the received positioning component image on the optical device 310 rather than the energy difference of the reflection signal generated by the optical device 310, and each positioning component in the positioning component image may be identified through different sizes. Therefore, the dielectric constant of each of the positioning components 311a to 311c may be the same as or different from the dielectric constant of the substrate 312, and the sizes of the positioning components 311a to 311c are different from each other. In the embodiment, the size of the positioning component 211a is greater than the size of the positioning component 211b, and the size of the positioning component 211b is greater than the size of the positioning component 211c.

The positioning device 320 of the camera captures the captured image of the optical device 310. The captured image shows the three positioning components 311a to 311c of different sizes. The positioning device 320 may identify the three positioning components 311a of different sizes through performing image processing, and analyze the position of the three positioning components 311a to 311c in the captured image to calculate the position signal.

Incidentally, in other embodiments, when using a camera for positioning, in addition to using positioning components of different sizes and positions, positioning components of different colors and positions may also be used, and the positioning components of different colors may also be identified through the captured images.

Since the positioning components 311a to 311c have different sizes and different positions, the positioning components 311a to 311c may be identified from the captured images received by the positioning device 320, so that the positioning device 320 may perform triangulation positioning calculation according to the positions of the positioning components 311a to 311c and obtain the position of the optical device 310. The positioning device 320 generates and transmits the position signal S_P and the angle signal S_P' to the projector 330 after obtaining the position information of the contact lens. The projector 330 shown in FIG. 3 and a controller 331 and an image light beam adjuster 332 included therein may be deduced by referring to the related description of the position signal S_P, the angle signal S_P', the projector 230, the controller 231, and the image light beam adjuster 232 shown in FIG. 2, and therefore are not repeated herein.

To sum up, in the projection system of the disclosure, positioning is performed on the the optical device through the positioning device, so that the projector determines the projection direction of the image light beam according to the position of the optical device, so as to accurately perform a positioning on the pupil position and the tracking of the field of view, and reduce the computing load of positioning and maximize the field of view at the same time.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. A projection system, comprising:
    an optical device, configured to be disposed on an eye and having a substrate and at least two positioning components, wherein the positioning components are respectively disposed on a plurality of different areas of the substrate;
    a positioning device, configured to perform a positioning on the optical device according to the positioning components on the substrate and generate a position signal; and
    a projector, configured to project an image light beam to the optical device, wherein the projector receives the position signal and determines a projection direction of the image light beam according to the position signal,
    wherein the positioning device comprises a radar, the radar projects a plurality of sensing signals to the at least two positioning components and receives a plurality of reflection signals, and the positioning device obtains the position signal according to the reflection signals.

2. The projection system according to claim 1, wherein the substrate of the optical device is a contact lens, and the at least two positioning components are respectively disposed on at least two different areas around the contact lens.

3. The projection system according to claim 1, wherein a dielectric constant of each of the at least two positioning components is different from a dielectric constant of the substrate.

4. The projection system according to claim 1, wherein sizes of the at least two positioning components are different from each other.

5. The projection system according to claim 1, wherein each of the at least two positioning components contains a metal component.

6. The projection system according to claim 1, wherein the projector comprises:
    an image light beam adjuster, configured to adjust the projection direction of the image light beam according to the position signal.

7. The projection system according to claim 6, wherein the image light beam adjuster comprises:
    an optical reflection component, configured to change the projection direction of the image light beam; and
    an actuator, configured to adjust a light reflection angle of the optical reflection component according to the position signal.

8. The projection system according to claim 7, further comprising:
    a controller, coupled to the actuator, and configured to drive the actuator according to the position signal to adjust the light reflection angle of the optical reflection component.

9. The projection system according to claim 1, wherein the positioning device generates the position signal according to a signal strength and a signal receiving time of each of the reflection signals.

10. The projection system according to claim 1, wherein the positioning device comprises a camera, the camera captures a captured image of the at least two positioning components, and the positioning device analyzes positions of the at least two positioning components in the captured image to calculate the position signal.

11. A contact lens, suitable for a virtual image display system, comprising:
    a substrate; and
    N number of positioning components, respectively disposed on a plurality of different areas on the substrate, wherein N is a positive integer greater than or equal to 2,
    wherein the virtual image display system comprises a radar that projects a plurality of sensing signals to the N number of positioning components and receives a plurality of reflection signals, and the virtual image display system obtains a position information of the N number of positioning components according to the reflection signals.

12. The contact lens according to claim 11, wherein a dielectric constant of each of the N number of positioning components is different from a dielectric constant of the substrate.

13. The contact lens according to claim 11, wherein sizes of the N number of positioning components are different from each other.

14. The contact lens according to claim 11, wherein each of the N number of positioning components contains a metal component.

15. The contact lens according to claim 11, wherein a camera included in the virtual image display system captures a captured image of the N positioning components, and the virtual image display system analyzes positions of the N positioning components in the captured image to calculate a position information.

* * * * *